(12) United States Patent
Dangoor et al.

(10) Patent No.: US 11,874,840 B2
(45) Date of Patent: Jan. 16, 2024

(54) TABLE DISCOVERY SERVICE

(71) Applicant: Intuit Inc., Mountain View, CA (US)

(72) Inventors: Sheer Dangoor, Ramat-Gan (IL); Aviv Ben Arie, Ramat Gan (IL)

(73) Assignee: Intuit Inc., Mountain View, CA (US)

( * ) Notice: Subject to any disclaimer, the term of this patent is extended or adjusted under 35 U.S.C. 154(b) by 53 days.

(21) Appl. No.: 17/589,322

(22) Filed: Jan. 31, 2022

(65) Prior Publication Data

US 2023/0244670 A1   Aug. 3, 2023

(51) Int. Cl.
*G06F 16/2455* (2019.01)
*G06F 16/22* (2019.01)

(52) U.S. Cl.
CPC .... *G06F 16/24564* (2019.01); *G06F 16/2282* (2019.01)

(58) Field of Classification Search
CPC .... G06F 16/245; G06F 16/248; G06F 16/288; G06F 16/9024; G06F 3/04847
USPC .......................................................... 707/774
See application file for complete search history.

(56) References Cited

U.S. PATENT DOCUMENTS

| | | | |
|---|---|---|---|
| 11,645,289 B2 * | 5/2023 | Helvik | G06F 16/24578 707/749 |
| 2004/0181543 A1 * | 9/2004 | Wu | G06F 16/90328 707/999.102 |
| 2021/0352099 A1 * | 11/2021 | Rogers | G06N 20/00 |

* cited by examiner

*Primary Examiner* — Hung T Vy
(74) *Attorney, Agent, or Firm* — FERGUSON BRASWELL FRASER KUBASTA PC

(57) ABSTRACT

A method implements a table discovery service. The method includes receiving a query string, converting the query string to a query graph, and identifying a selected graph, of a set of graphs, that matches the query graph. The method further includes transmitting a notification identifying a previously generated table corresponding to the selected graph, receiving a notification response to accept the previously generated table, and transmitting data from the previously generated table in response to the query string.

20 Claims, 5 Drawing Sheets

TABLE DISCOVERY SERVICE

BACKGROUND

Databases store massive amounts of data and information. Users may request data for training algorithms and machine learning models using queries. Tables are generated from databases in response to the queries, which identify the data to be retrieved from the databases. In a cloud environment, multiple different users may request similar data using the same or similar queries. A challenge is to respond to queries without generating duplicate tables.

SUMMARY

In general, in one or more aspects, the disclosure relates to a method implementing a table discovery service. The method includes receiving a query string, converting the query string to a query graph, and identifying a selected graph, of a set of graphs, that matches the query graph. The method further includes transmitting a notification identifying a previously generated table corresponding to the selected graph, receiving a notification response to accept the previously generated table, and transmitting data from the previously generated table in response to the query string.

In general, in one or more aspects, the disclosure relates to a system that includes a graph controller, a selection controller, a table controller, and a server application. The graph controller is configured to generate a set of query graphs. The selection controller is configured to identify a selected graph from the set of query graphs. The table controller is configured to transmit a previously generated table corresponding to the selected graph. The server application executes on one or more servers and is configured for receiving a query string and converting, by the graph controller, the query string to the query graph. The server application is further configured for identifying, by the selection controller, the selected graph, of the set of graphs, that matches the query graph. The server application is further configured for transmitting a notification identifying the previously generated table corresponding to the selected graph, receiving a notification response to accept the previously generated table, and transmitting, by the table controller, data from the previously generated table in response to the query string.

In general, in one or more aspects, the disclosure relates to a method using a table discovery service. The method includes receiving, by a user interface, a query string. The method further includes receiving a notification. The query string is converted to a query graph. A selected graph, of a set of graphs, is identified that matches the query graph. The notification identifies a previously generated table corresponding to the selected graph. The method further includes transmitting a notification response to accept the previously generated table and presenting data, in the user interface, that is received from the previously generated table in response to the query string.

Other aspects of the invention will be apparent from the following description and the appended claims.

DETAILED DESCRIPTION

Figure 1:
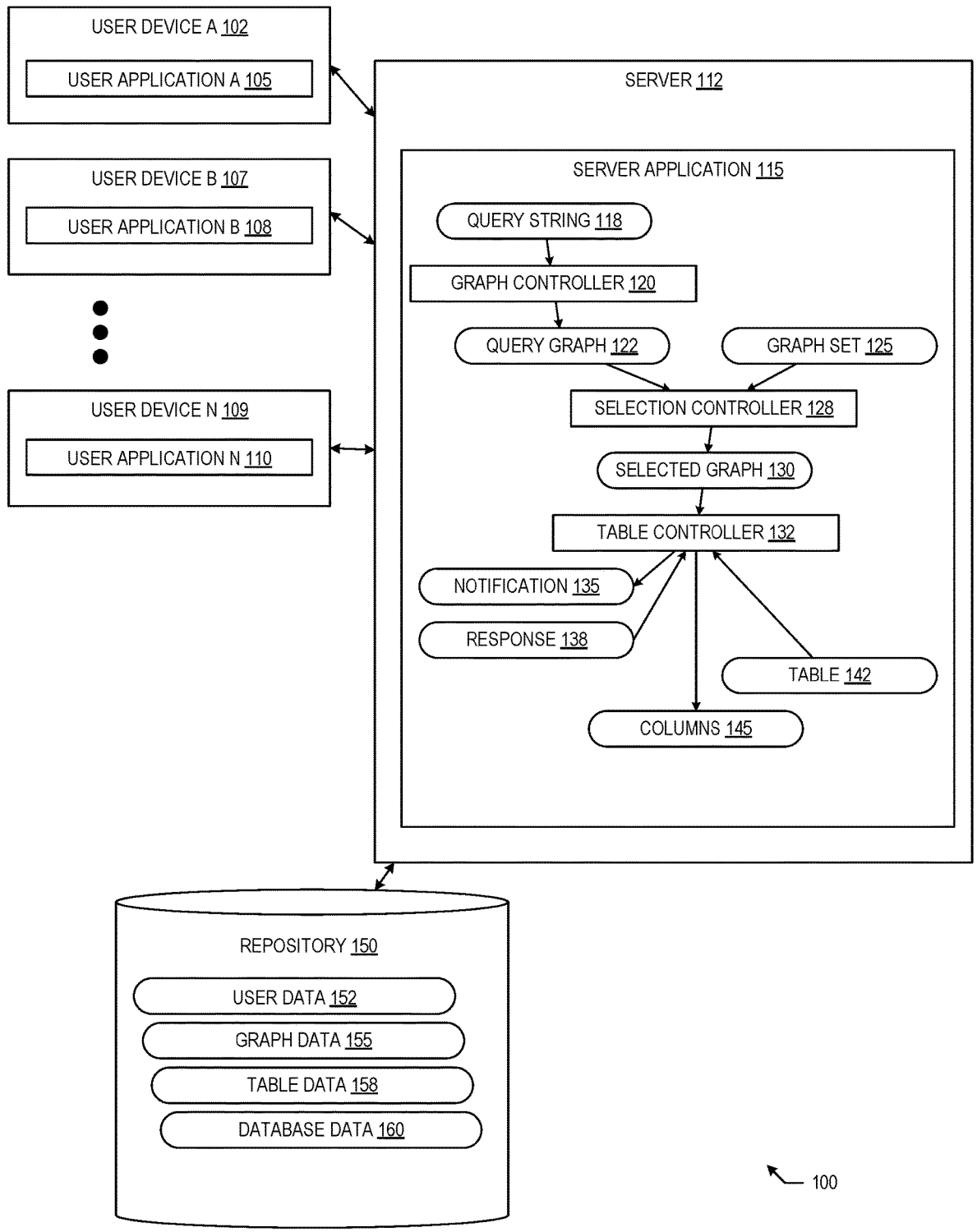
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure respond to queries at scale while reducing the number of tables generated in response to the queries. A user may be training a machine learning model and request a large amount of data (e.g., thousands to millions of rows with tens to thousands of columns). The user specifies a query using a query language, e.g., SQL (structured query language). The system receives the query and converts the text of the query to a graph (referred to as a query graph) with nodes corresponding to words from the query. In one embodiment, keywords from the query may correspond to edges of the query graph.

After converting the query to the query graph, the query graph is compared to other query graphs generated from other queries. In one embodiment, when a match is found between the query graph and the other query graphs, the user is given the option to use the table generated for the matching query graph instead of generating a new table. The data from the table is then transmitted using either the cached table corresponding to the matching query graph or a new table generated in response to the query of the user.

FIG. 1 shows a diagram of embodiments that are in accordance with the disclosure. Embodiments of FIG. 1 may be combined and may include or be included within the features and embodiments described in the other figures of the application. The features and elements of FIG. 1 are, individually and as a combination, improvements to data retrieval and algorithm training technology and computing systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) implements a table discovery service that responds to user queries. In one embodiment, the user devices A (102) and B (107) through N (109) interact with the server (112) to retrieve the database data (160) from the repository (150). The user devices A (102) and B (107) through N (109) generate queries, serviced by the server application (115), and display the database data (160) retrieved in response to the queries.

Figure 4A:
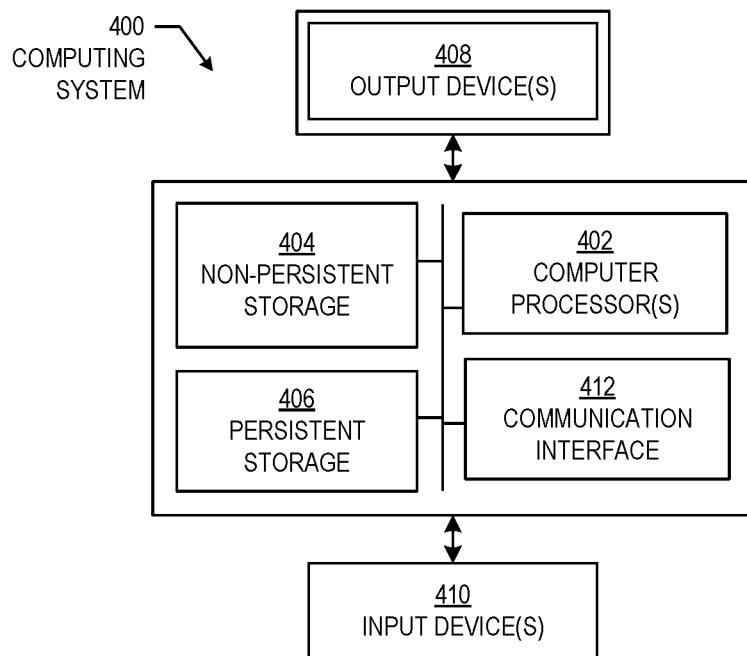
FIG. 4A and FIG. 4B show computing systems in accordance with disclosed embodiments.

The server (112) is a computing system (further described in FIG. 4A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115).

The server application (115) is a collection of programs that may execute on multiple servers of a cloud environment, including the server (112). In one embodiment, the server application (115) hosts websites used to construct queries and display data. The websites hosted by the server application (115) may serve structured documents (hypertext markup language (HTML) pages, extensible markup language (XML) pages, JavaScript object notation (JSON) files and messages, etc.). The server application (115) includes the graph controller (120), the selection controller (128), and the table controller (132).

The query string (118) is a string of text received from one of the user devices A (102) and B (107) through N (109) by the server (112). The server (112) may receive multiple query strings (including the query string (118)) from multiple devices (including, e.g., the user device A (102)). The query string (118) identifies the database data (160) that is to be retrieved from a database formed by the database data (160). The query string (118) is input to the graph controller (120).

The graph controller (120) is a set of hardware and software components of the server application (115). The graph controller (120) converts the query string (118) to the query graph (122).

The query graph (122) is a graph created from the query string (118). In one embodiment, words from the query string (118) correspond to nodes of the query graph (122) and keywords from the query string (118) correspond to edges of the query graph (122).

The graph set (125) is a set of graphs created from other query strings. The graphs of the graph set (125) correspond to tables in the table data (158) that have been generated from the database data (160).

The selection controller (128) is a set of hardware and software components of the server application (115). The selection controller (128) identifies the selected graph (130) using the query graph (122) and the graph set (125). The selection controller (128) identifies the selected graph (130) by matching the query graph (122) to a graph in the graph set (125).

A matching graph from the graph set (125) is identified by determining that at least a subset of the nodes of the matching graph are the same as the nodes of the query graph (122). For example, the nodes that identify the columns and origin tables from the matching graph are determined to at least include the nodes that identify the columns and origin tables from the query graph (122). Determining a match between the matching graph and the query graph (122) also identifies that the underlying query string, from which the matching graph was created, may identify a superset of the database data (160) that includes the data identified by the query string (118).

The selected graph (130) is a graph selected by the selection controller (128). The selected graph (130) is the matching graph from the graph set (125) when a matching graph is identified. When there is no matching graph, the selected graph (130) is the query graph (122).

The table controller (132) is a set of hardware and software components of the server application (115). The table controller (132) transmits the columns (145) from the table (142) based on the selected graph (130). When the selected graph (130) is a matching graph from the graph set (125), the table controller (132) may retrieve the table (142) from a cache that includes the table data (158) from the repository (150).

The table controller (132) may also transmit the columns (145) based on the response (138). When the selected graph (130) is a matching graph from the graph set (125), the table controller (132) sends the notification (135) to the user device (e.g., the user device A (102)) that transmitted the query string (118). The table controller (132) receives the response (138) in response to the notification (135).

The notification (135) is a message sent to the user device A (102) in response to the selected graph (130) being a matching graph from the graph set (125). The notification (135) may be displayed by the user application A (105). The notification (135) indicates that a previously generated table from the table data (158) includes the data requested by the query string (118).

The response (138) is a message from a user device (e.g., the user device A (102)). The response (138) is a response to the notification (135) and identifies whether a previously generated table is to be used to respond to the query string (118).

The table (142) is a subset of the table data (158) that includes the at least the data specified by the query string (118). When the selected graph (130) is a matching graph from the graph set (125) and when the response (138) is provided and allows for the use of a previously generated table, the table (142) is the previously generated table. When the query graph (122) does not match to a graph from the graph set (125) or the response (138) is provided and does not allow for the use of a previously generated table, the table (142) is a newly generated table created using the query string (118).

The columns (145) include the data from the table (142) that are responsive to the query string (118). The columns (145) may include a subset of the columns available in the table (142). The columns (145) may be transmitted on demand to a user device (e.g., the user device A (102)).

The user devices A (102) and B (107) through N (109) are computing systems (further described in FIG. 4A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to display and manipulate the table data (158) stored in the repository (150), which may be used to train machine learning models. The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment the user applications A (105) and B (108) through N (110) include web browser programs that display web pages from the server (112).

In one embodiment, the user applications A (105) and B (108) through N (110) provide graphical user interfaces that display query stings along with the database data (160) retrieved for the query strings. In one embodiment, the user applications A (105) and B (108) through N (110) provide command line interfaces that receive commands (e.g., query requests) and output responses to the commands (e.g., the database data (160)).

In one embodiment, the user devices A (102) and B (107) through N (109) may be used to identify the table data (158), which is retrieved from a database. The user applications A (105) and B (108) through N (110) may provide user interfaces within which a query may be input, that defines the table data (158). The user interfaces may also display the data retrieved by the query.

As an example, the user application A (105) be used by a user to construct the query string (118), which is transmitted to the server application (115) by the user device A (102). In response to the query string (118), the user device A (102) may receive the notification (135) and prompt the user on whether to use a previously generated table for responding to the query string (118). The user device A (102) transmits the response (138) to identify whether the previously generated table is to be used. The user device A (102) may receive and display data from the columns (145) that are transmitted by the server (112), which is in response to the query string (118), and which may be in response to the response (138).

The repository (150) is a computing system that may include multiple computing devices in accordance with the computing system (400) and the nodes (422) and (424) described below in FIGS. 4A and 4B. The repository (150) may be hosted by a cloud services provider that also hosts the server (112). The cloud services provider may provide hosting, virtualization, and data storage services as well as other cloud services and to operate and control the data, programs, and applications that store and retrieve data from the repository (150). The data in the repository (150) includes the user data (152), the graph data (155), the table data (158), the database data (160), etc.

The user data (152) identifies the permissions of the users of the system (100) for accessing the database data (160). The user data (152) may include identifiers for the user applications (and corresponding users) that access the system (100). The identifiers may be used in the messages passed between the user devices A (102) and B (107) through N (109) and the server (112), including the messages used to transmit the query string (118), the notification (135), the response (138), the table (142), the columns (145), etc.

The graph data (155) is a set of data that includes the graphs for which there is table data (158). Each graph in the graph data is generated from a query string received by the system (100). Multiple graphs may correspond to a single table in the table data (158).

The table data (158) is a set of data that includes the data for the tables for which there is at least one corresponding graph in the graph data (155). A single table may correspond to multiple graphs from the graph data (155).

As an example, the user device A (102) transmits a first query string that requests data that is a superset of data requested by a second query string from the user device B (107). A table (stored in the table data (158)) is generated that is responsive to the first query. A first graph for the first query string from the user device A (102) may be different from a second graph for the second query string from the user device B (107). The first graph and the second graph may each correspond to the same table in the table data (158) that was generated in response to the first query string. The first graph and the second graph may each correspond to the same table since the data for the second query string is a subset of the data for the first query string and is contained in the table generated for the first query string.

The database data (160) is a set of data that includes the data that can be retrieved by a query. The database data (160) is the source from which the tables in the table data (158) are generated and may include multiple databases.

Although shown using a distributed computing architectures and systems, other architectures and systems may be used. In one embodiment, the server application (115) may be part of a monolithic application that implements a table discovery service. In one embodiment, the user applications A (105) and B (108) through N (110) may be part of a monolithic applications that implement table discovery without the server application (115).

Figure 2:
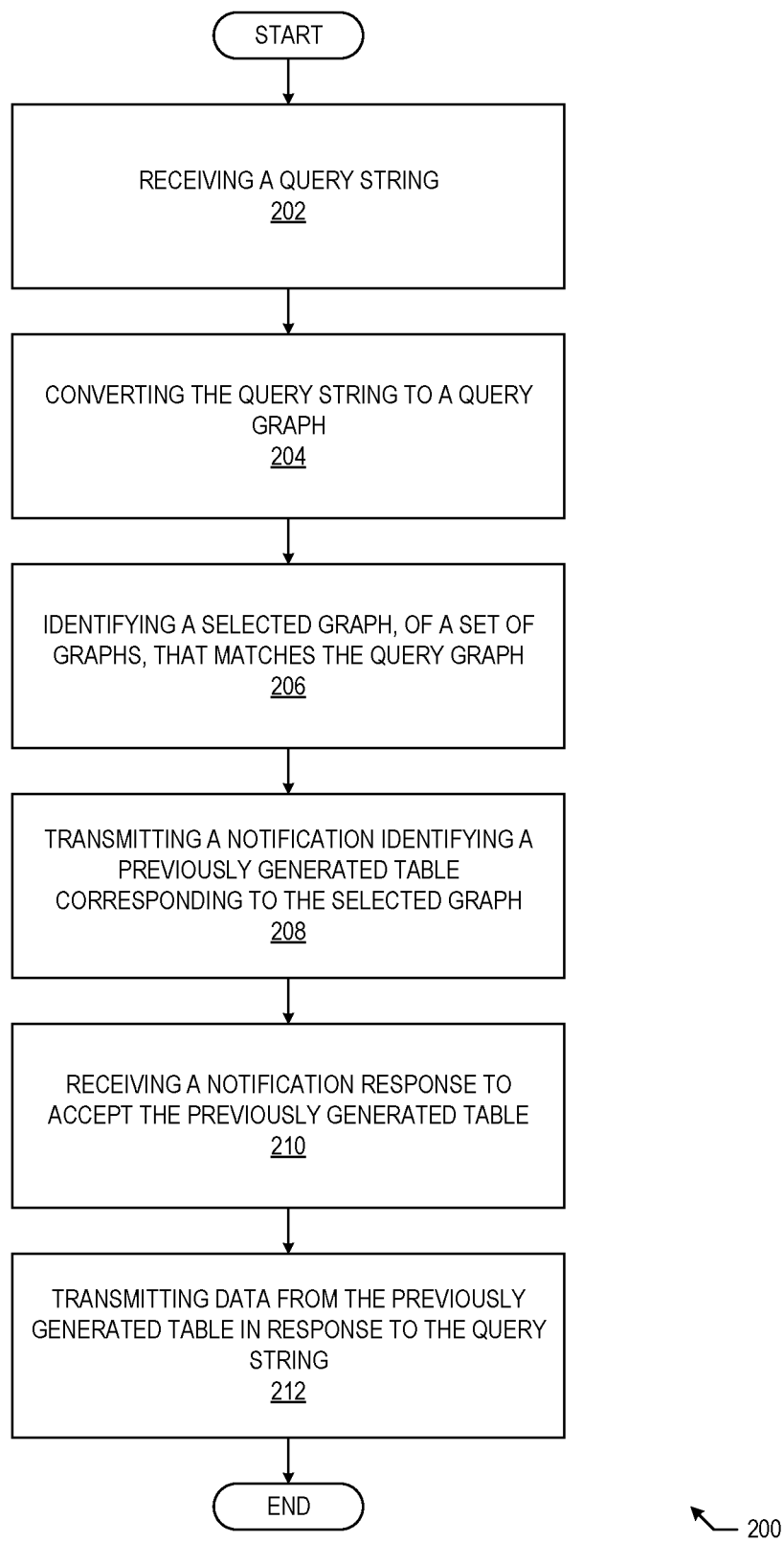
FIG. 2 shows a flowchart in accordance with disclosed embodiments.

FIG. 2 shows a flowchart of a process in accordance with the disclosure. FIG. 2 illustrates the process (200) to implement table discovery. The embodiments of FIG. 2 may be combined and may include or be included within the features and embodiments described in the other figures of the application. The features of FIG. 2 are, individually and as an ordered combination, improvements to data retrieval and algorithm training technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2, the process (200) processes query strings. The process (200) may be performed by a server computer in conjunction with a user device.

At Step 202, a query string is received. The query string may be structured and formatted in accordance with a query language (e.g., structured query language (SQL)). The query string may be received by a server from a user device in response to user input received by the user device defining the query string. In one embodiment, the user device may present a user interface to a user that inputs the query string using a human interface device (keyboard, mouse, touchscreen, etc.). The user interface may be a graphical user interface and may include a command line interface.

At Step 204, the query string is converted to a query graph. The query graph includes nodes and edges with values that correspond to words from the query string.

In one embodiment, the query graph is generated from the query string by converting words from the query string to nodes of the query graph. For example, the words of the query string may identify columns and origin tables that contain the data requested by the query string. The nodes of the query graph may have values that include the words from the query string that identify the columns and origin tables.

In one embodiment, the query graph is generated from the query string by converting keywords from the query string to edges of the query graph. The keywords are reserved words that are used to perform various operations with a database. For example, the "select" keyword is used to select data from a database or table. The edges of the graph may have values that include the keywords from the query string.

In one embodiment, a table name may be extracted from the query string. The table name identifies the name of the table to be returned by the query. A value of a root node of the query graph may be set to the table name.

In one embodiment, a set of origin table names is extracted from the query string using a regular expression to identify the set of origin table names. The values of a first set of nodes of the query graph, and connected to the root node, may be set to the set of origin table names. The nodes with the origin table names may be leaf nodes (nodes with no child nodes) in the query graph.

In one embodiment, a set of selected column names is extracted from the query string using a regular expression to identify the set of selected column names. Different regular expressions may be used to identify different names from the query string. Values of a set of nodes, of the query graph and connected to the root node, may be set to the set of selected column names. The nodes with the column names may be leaf nodes (nodes with no child nodes) in the query graph.

In one embodiment, extracting selected dates from the query string using a second regular expression to identify the selected dates. Values of a set of nodes, of the query graph and connected to the root node, may be set to include the selected dates. The dates may be used to filter the data that is provided to the user in response to the query string.

At Step 206, a selected graph, of a set of graphs, that matches the query graph is identified. The selected graph may be the query graph or a previously generated graph from a set of graphs (referred to as a graph set). When the query graph matches with a candidate graph form the graph set, the data requested by the query string (used to form the query graph) is at least a subset of the data in the table that corresponds to the candidate graph.

In one embodiment, the graph set is created from previous queries. A previous query is received. A previous graph is generated for each of the previous queries after receiving the previous queries. The previous graphs are added to the set of graphs. One of the previous graphs from the graph set may be identified as the selected graph that matches to the query graph.

In one embodiment, the selected graph is identified using one or more of a Hoperoft-Karp algorithm and a Hungarian algorithm. A Hoperoft-Karp algorithm takes as input a bipartite graph and produces as output a maximum cardinality matching, which is a set of as many edges as possible with the property that no two edges share an endpoint. The bipartite graph may be formed with a first set from the query graph and a second set from a candidate graph from a set of previously generated graphs.

In one embodiment, bipartite graphs may be generated for each different type (or value) of edge in the query graph and candidate graph. For example, a bipartite graph may be generated with a first set for the nodes from the query graph connected to an edge with a value of "select" and a second set for similar nodes from the candidate graph. Another bipartite graph may be created for nodes connected using the edges with the value of "origin table" from the query graph (forming a first set) and the candidate graph (forming a second set).

A Hungarian algorithm is a combinatorial optimization algorithm that solves the assignment problem in polynomial time. In one embodiment, a matrix is formed with rows and columns for the names of the nodes from the query graph and the candidate graph (e.g., row names for query graph values and column names for candidate graph values). The values within the matrix identify whether there is a match between a node from the query graph to a node from the candidate graph. When each of the values for the query graph match to a value from the candidate graph, then the query graph may be a subset of and match to the candidate graph. A matrix may be generated for each type of edge from the query string and candidate string.

At Step 208, a notification is transmitted identifying a previously generated table corresponding to the selected graph. The notification indicates that the data requested by the query string is available in a previously generated table (which corresponds the selected graph).

At Step 210, a notification response is received to accept the previously generated table. In one embodiment, the notification response indicates that the user has accepted the use of the previously generated table and that a new table should not be generated to respond to the query string.

In one embodiment, the previously generated table is constructed in response to a previous query that corresponds to the selected graph. The previous query may have been received from a different user device and be for a different user.

At Step 212, data from the previously generated table is transmitted in response to the query string. In one embodiment, the data is transmitted from a server to a user device. The data may include the entirety of the data and columns requested in the query string. In one embodiment, the data may be provided on demand.

In one embodiment, a request to drop a previously generated table may be received. For example, after the table has been used by the user or the user logs off, the removal request may be sent. In response to the request, the query graph that corresponds to the user and the table is removed. The system may then search for the remaining graphs to identify a graph that still corresponds to the table. In response to not finding a graph that still corresponds to the table, the table may be dropped.

Figure 3A:
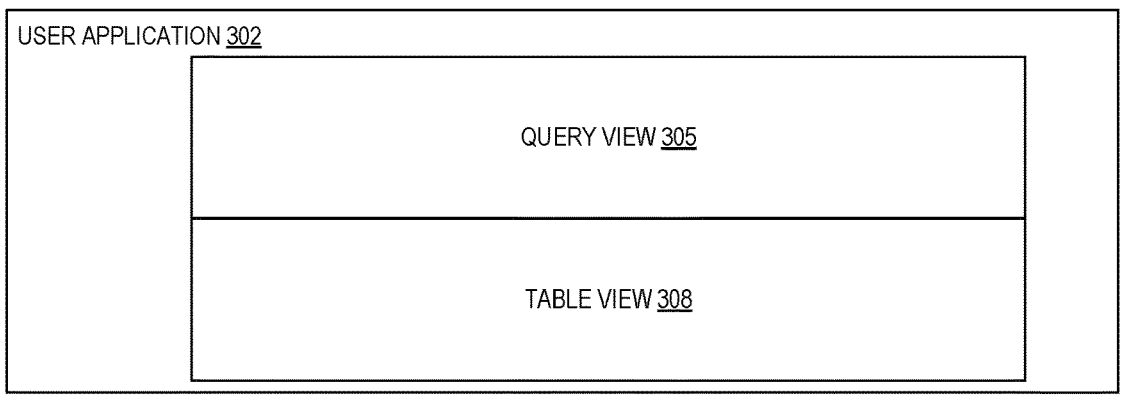
FIG. 3A, FIG. 3B, FIG. 3C, FIG. 3D, and FIG. 3E show examples in accordance with disclosed embodiments.
Figure 3B:
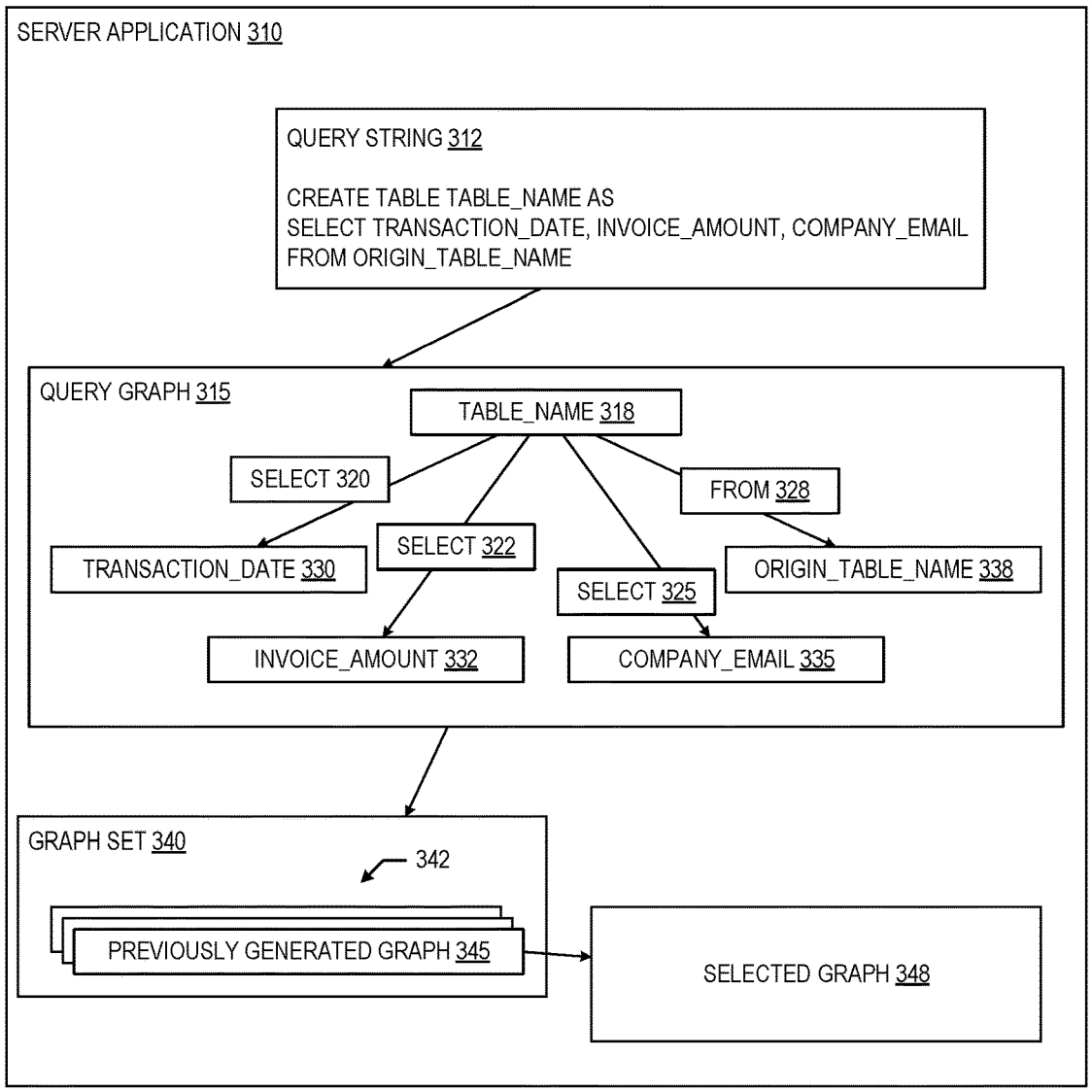
Figure 3C:
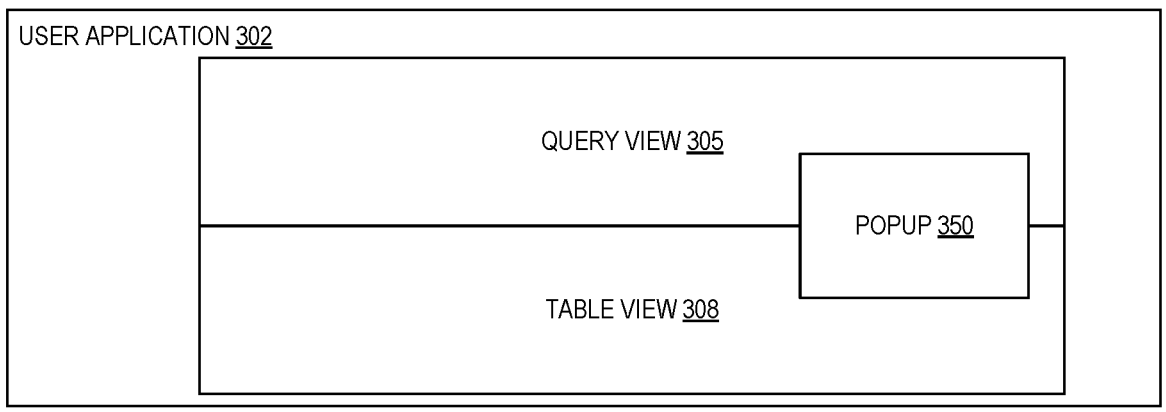
Figure 3D:
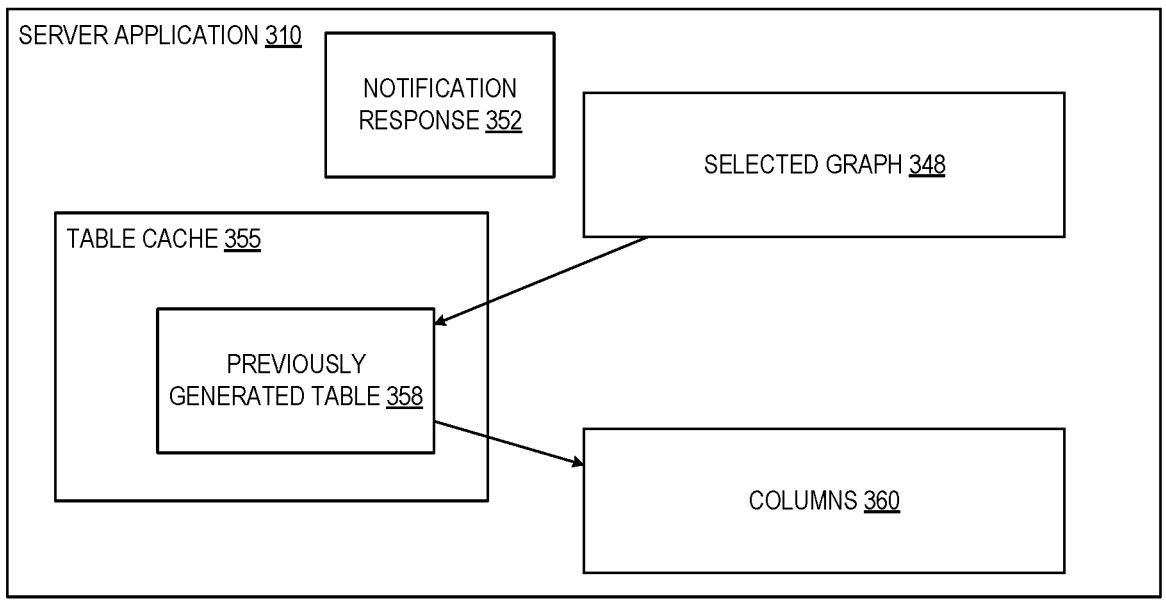
Figure 3E:
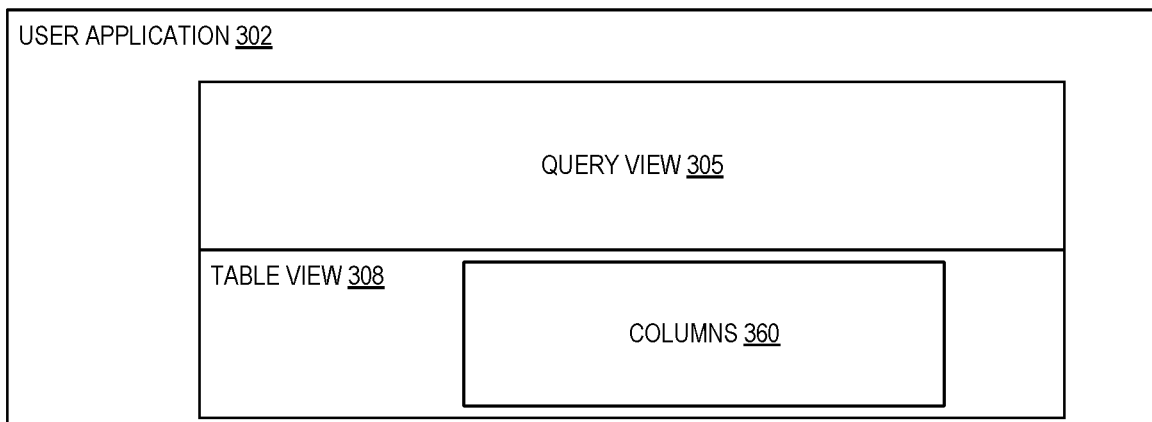

FIGS. 3A through 3E show examples in accordance with the disclosure. FIG. 3A shows the user application (302) receiving a query string. FIG. 3B shows the server application (310) converting the query string to the query graph (315) and identifying the selected graph (348). FIG. 3C shows the user application (302) displaying the popup (350). FIG. 3D shows the server application retrieving and transmitting the columns (360). FIG. 3E shows the user application (302) displaying the columns (360). The embodiments shown in FIGS. 3A through 3E may be combined and may include or be included within the features and embodiments described in the other figures of the application. The features and elements of FIGS. 3A through 3E are, individually and as a combination, improvements to data retrieval and algorithm training technology and computing systems. The various features, elements, widgets, components, and interfaces shown in FIGS. 3A through 3E may be omitted, repeated, combined, and/or altered as shown. Accordingly, the scope of the present disclosure should not be considered limited to the specific arrangements shown in FIGS. 3A through 3E.

Turning to FIG. 3A, the user application (302) includes the query view (305) and the table view (308). The query view (305) displays the query string input by a user to the user application (302). The table view (308) will show data from the table responsive the query string. In one embodiment, the user application (302) includes a graphical user interface that shows the views (305) and (308) in one or multiple windows.

In one embodiment, the user application (302) includes a command line interface that receives text from the user in the form of commands and displays the output of the commands in the same window. With a command line interface, the query view (305) may be the input command and the table view (308) may be the output from the command.

Turning to FIG. 3B, the server application (310) receives the query string (312). The query string (312) is received from the user application (302) (of FIG. 3A). The query string (312) includes the text with words and keywords.

The keywords include "CREATE TABLE . . . AS . . . SELECT . . . FROM". The remaining words include "TABLE_NAME . . . TRANSACTION_DATE, INVOICE_AMOUNT, COMPANY_EMAIL . . . ORIGIN_TABLE_NAME".

"CREATE TABLE . . . AS" requests that a new table be created in response to the query string (312). A new table may not be created when a matching graph from the query string is found. The new table is expected to have the name "TABLE_NAME".

"SELECT . . . FROM . . . " identifies the data (i.e., columns) and the origin table from which the new table is to be built. The columns include "TRANSACTION_DATE, INVOICE_AMOUNT, COMPANY_EMAIL" and the origin table is a table with the name "ORIGIN_TABLE_NAME".

The server application (310) converts the query string (312) to the query graph (315). In one embodiment, a regular expression may be used to identify the name "TABLE_NAME" from the query string (312). The name "TABLE_NAME" is assigned to the root node (318) of the query graph (315).

The query graph (315) includes the edges (320), (322), (325), and (328) with the nodes (330), (332), (335), and (338). The edges (320), (322), (325), and (328) and the nodes (330), (332), (335), and (338) are generated from the query string (312). The nodes (330), (332), and (335) have the edges (320), (322), and (325), respectively, that each have the value "SELECT" to identify that the words "TRANSACTION_DATE, INVOICE_AMOUNT, COMPANY_EMAIL" are part of the "SELECT" statement in the query string (312). The node (338) has the edge (328) with the value "FROM" to identify the word "ORIGIN_TABLE_NAME" of the node (338) is from the "FROM" statement of the query string (312).

After generating the query graph (315), the server application (310) compares the query graph (315) to the graphs of the graph set (340). The graph set (340) includes multiple previously generated graphs (342), which include the previously generated graph (345). The server application (310) compares the query graph (315) to the previously generated graphs (342) to identify the selected graph (348).

If the query graph (315) matches one of the previously generated graphs (342), then the matching graph is the selected graph (348). Otherwise, the selected graph is the query graph (315). When the matching graph exists, the leaf nodes (330), (332), (335), and (338) from the query graph (315) exist in the matching graph and have the same values. The root node may have a different value in the matching graph and the matching graph may have additional leaf nodes that do not match up to nodes form the query graph (315).

When a matching graph is identified, a notification is generated. The notification indicates that a previously generated table exists that includes the data requested by the query string (312). The notification is sent to the user application (302) (of FIG. 3A).

Turning to FIG. 3C, the user application (302) is updated to show the popup (350). The popup (350) is displaying the notification generated by the server application (310) (of FIG. 3B). The popup (350) indicates that a previously generated table exists and prompts the user to decide whether the previously generated table should be used to respond to the query string (312) (of FIG. 3B). The user responds to the popup (350) and the user application (302) sends a message (also referred to as a notification response) to the server application (310) (of FIG. 3B).

Turning to FIG. 3D, the server application (310) is updated by receiving the notification response (352). The notification response (352) identifies whether to use the previously generated table (358) to respond to the query string (312) (of FIG. 3B).

The notification response (352) indicates that the previously generated table (358) is to be used. In response, the server application (310) identifies the previously generated table (358) in the table cache (355) from the selected graph (348). In one embodiment the selected graph (348) includes a reference to the previously generated table (358).

After locating the previously generated table (358), the server application (310) retrieves the columns (360) from the previously generated table (358). The columns (360) were the columns specified in the query string (312) (of FIG. 3B). The previously generated table (358) may include additional columns that are not part of the columns (360).

After identifying the columns (360), the server application (310) transmits data from the columns (360) to the user application (302) (of FIG. 3C). The data from the columns may be sent in a piecemeal fashion to reduce the amount of bandwidth used.

Turning to FIG. 3E, the user application (302) is updated to show the columns (360) in the table view (308). The columns (360) may be shown with column headers and values for the rows within the columns.

In one embodiment, the user application (302) is a program running on a server that may include a machine learning model. After receiving the columns (360) at the user application (302), the user may use the data from the columns (360) to train the machine learning model.

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Figure 4B:
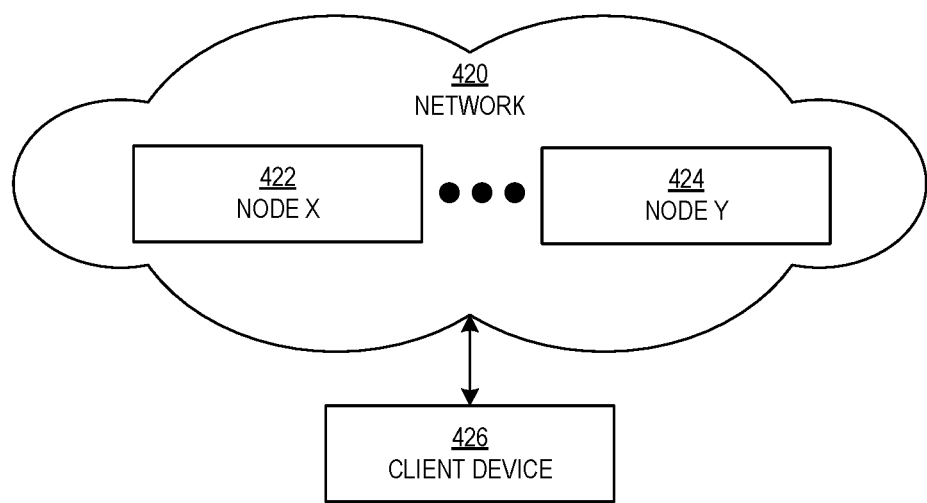

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving a query string comprising a structured language query data structure;
converting the query string to a query graph comprising a graph data structure having a plurality of nodes connected by at least one edge;
comparing the graph data structure to a set of graph data structures stored in a data repository of a computer system;
identifying a selected graph, from the set of graph data structures, that matches the query graph;
transmitting, to a user device, a notification identifying a previously generated table corresponding to the selected graph;
receiving, from the user device, a notification response to accept the previously generated table; and
transmitting, to the user device, data from the previously generated table in response to the query string.

2. The method of claim 1, further comprising:
generating the query graph from the query string by converting words from the query string to nodes of the query graph.

3. The method of claim 1, further comprising:
generating the query graph from the query string by converting keywords from the query string to edges of the query graph.

4. The method of claim 1, further comprising:
extracting a table name from the query string; and
setting a value of a root node, of the query graph, to the table name.

5. The method of claim 1, further comprising:
extracting a set of origin table names from the query string using a regular expression to identify the set of origin table names; and
setting values of a first set of nodes, of the query graph and connected to a root node of the graph data structure, to the set of origin table names.

6. The method of claim 1, further comprising:
extracting a set of selected column names from the query string using a regular expression to identify the set of selected column names; and
setting values of a second set of nodes, of the query graph and connected to a root node of the graph data structure, to the set of selected column names.

7. The method of claim 1, further comprising:
extracting selected dates from the query string using a second regular expression to identify the selected dates; and
setting values of a second set of nodes, of the query graph and connected to a root node of the graph data structure, to include the selected dates.

8. The method of claim 1, further comprising:
identifying the selected graph using one or more of a Hoperoft-Karp algorithm and a Hungarian algorithm.

9. The method of claim 1, further comprising:
receiving a previous query;
generating, from the previous query, a previous graph; and
adding the previous graph to the set of graphs, wherein the previous graph is identified as the selected graph.

10. The method of claim 1, further comprising:
constructing the previously generated table in response to a previous query that corresponds to the selected graph.

11. The method of claim 1, further comprising:
receiving a request to drop the previously generated table;
removing the query graph from the set of graphs;
searching the set of graph data structures for at least one graph data structure that corresponds to the previously generated table; and
dropping the previously generated table in response to not finding the at least one graph data structure that corresponds to the previously generated table.

12. A system comprising:
a graph controller configured to generate a set of query graphs, each of the query graphs comprising a corresponding graph data structure having a corresponding plurality of nodes connected by at least one corresponding edge;
a selection controller configured to identify a selected graph from the set of query graphs;
a table controller configured to transmit, to a user device, a previously generated table corresponding to the selected graph; and
a server application executing on one or more servers and configured for:
receiving a query string comprising a structured language query data structure;
converting, by the graph controller, the query string to a received query graph;
comparing the received query graph to the set of query graphs;

identifying, by the selection controller, the selected graph, of the set of query graphs, that matches the received query graph;

transmitting, to a user device, a notification identifying the previously generated table corresponding to the selected graph;

receiving, from the user device, a notification response to accept the previously generated table; and transmitting, by the table controller and to the user device, data from the previously generated table in response to the query string.

13. The system of claim 12, wherein the server application is further configured for:

generating the set of query graphs from the query string by converting words from the query string to nodes of the set of query graphs.

14. The system of claim 12, wherein the server application is further configured for:

generating the set of query graphs from the query string by converting keywords from the query string to edges of the set of query graphs.

15. The system of claim 12, wherein the server application is further configured for:

extracting a table name from the query string; and setting a value of a root node, of the set of query graphs, to the table name.

16. The system of claim 12, wherein the server application is further configured for:

extracting a set of origin table names from the query string using a regular expression to identify the set of origin table names; and setting values of a first set of nodes, of the set of query graphs and connected to a root node of the set of query graphs, to the set of origin table names.

17. The system of claim 12, wherein the server application is further configured for:

extracting a set of selected column names from the query string using a regular expression to identify the set of selected column names; and setting values of a second set of nodes, of set of query graphs and connected to a root node of the set of query graphs, to the set of selected column names.

18. The system of claim 12, wherein the server application is further configured for:

extracting selected dates from the query string using a second regular expression to identify the selected dates; and setting values of a second set of nodes, of set of query graphs and connected to a root node of the set of query graphs, to include the selected dates.

19. The system of claim 12, wherein the server application is further configured for:

identifying the selected graph using one or more of a Hoperoft-Karp algorithm and a Hungarian algorithm.

20. A method comprising:

transmitting, by a user interface of a user device, a query string comprising a structured language query data structure;

receiving, from a server device, a notification,
   wherein the query string is converted to a query graph comprising a graph data structure having a plurality of nodes connected by at least one edge,
   wherein a selected graph data structure, of a set of graph data structures stored in a data repository of a computer system, is identified that matches the query graph,
   wherein the selected graph data structure is identified by comparing the query graph to the set of graph data structures; and
   wherein the notification identifies a previously generated table corresponding to the selected graph data structure;

transmitting, by the user device, a notification response to accept the previously generated table; and presenting data, in the user interface of the user device, that is received from the previously generated table in response to the query string.

\* \* \* \* \*